UNITED STATES PATENT OFFICE 2,440,659

CYANOTHIOPHANES AND METHODS OF PREPARING SAME

Bernard R. Baker, Nanuet, N. Y., assignor, by mesne assignments, to American Cyanamid Company, New York, N. Y., a corporation of Maine No Drawing. Application June 21, 1945, Serial No. 600,831

9 Claims. (Cl. 260—329)

The present invention relates to new organic compounds and to methods of preparing the same. More particularly, it relates to cyanothiophanes and their preparation.

The compounds of the present invention can be prepared by condensing a mono or dicarboxylic thio ester with an unsaturated nitrile in accordance with the following equation:

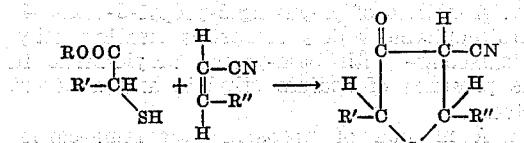

wherein R is alkyl and R' and R'' are hydrogen, alkyl, carbalkoxy or carbalkoxy-alkyl.

The compounds of the present invention are in general oils which are soluble in aqueous alkali and in organic solvents such as benzene, carbon tetrachloride, chloroform, etc.

In carrying out my invention a large number of mono and dicarboxylic thio esters can be used as intermediates, the principal requirement being that the thio group is attached to a carbon atom adjacent to a carbonyl group. Among these may be specifically mentioned: ethyl thioglycolate, methyl thioglycolate, ethyl α-thiopropionate, methyl α-thiopropionate, ethyl α-thiobutyrate, methyl α-thiovalerate, ethyl α-thiocaproate, methyl α-thiocaprylate, ethyl α-thiosuccinate, methyl α-thioglutarate, ethyl α-thioadipate, methyl α-thioadipate, ethyl α-thiopimelate, methyl α-thiopimelate, and the like.

Similarly, a number of unsaturated nitriles may be used as the second intermediate in preparing the thiophanes of the present invention. Among these may be mentioned: acrylonitrile, β-methyl acrylonitrile, β-ethyl acrylonitrile, β-propyl acrylonitrile, β-butyl acrylonitrile, nitriles having the formula

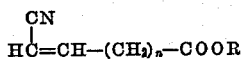

where $n$ is a small whole number from 1 to 5 inclusive and R is alkyl, such as methyl-6-cyano-5-hexenoate; nitriles having the formula

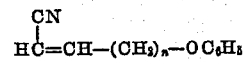

where $n$ is a small whole number from 1 to 5 inclusive, such as β-(δ-phenoxybutyl) acrylonitrile, etc.

In preparing the thiophanes of the present invention I prefer to dissolve the thioester and the unsaturated nitrile in an inert solvent such as benzene, ether, dioxane, etc. A catalyst such as an alkali metal, alkali metal alcoholate, alkali metal amide, etc. is added to the reaction mixture and the mixture is heated at a temperature of from about 60°–120° C. A convenient method is to heat the reaction mixture at refluxing temperatures. During the process of refluxing which usually is completed in from about one-half hour to about five hours occasionally the alkali metal salt of the product separates.

The product may be recovered from the reaction mixture containing the alkali metal salt by acidifying the mixture and then fractionally distilling to obtain the pure product. However, I prefer to recover the product by extracting the reaction mixture with iced water and iced aqueous alkali solution, such as potassium hydroxide solution. The aqueous extracts are then acidified, and the oil which separates is extracted with a water immiscible solvent such as benzene. This extract is then fractionally distilled to give a pure product.

These compounds are useful as intermediates in the preparation of antivitamins and vitamins such as biotin.

The following specific examples show the preparation of illustrative cyano ketothiophanes from thioesters and unsaturated nitriles. It will be understood that various modifications may be made in the specific procedures described without departing from the scope of the invention.

Example 1

To a dry sodium ethylate from 8.3 g. of sodium and 200 cc. of absolute ethanol obtained by evaporating the solution to dryness in vacuo was added in a nitrogen atmosphere 42.5 g. of ethyl thioglycolate, 37.2 g. of β-propyl acrylonitrile and 100 cc. of benzene. After being refluxed for one hour during which time the sodium salt separated, the mixture was cooled and extracted with ice water, then cold (0° C.) 3% sodium hydroxide. The combined extracts were immediately acidified, then extracted with benzene, washed with water and distilled. A yield of 31 g. (52%) of 2-propyl-3-cyano-4-keto-thiophane having a boiling point of 127°–130° C. was obtained.

Example 2

To a dry sodium methoxide from 0.6 g. of sodium was added 3.6 g. of methyl α-mercaptoadipate and 1.2 cc. of acrylonitrile in 25 cc. of benzene. After being refluxed two hours, the solution was cooled in ice, extracted with iced water and iced 3% sodium hydroxide. The aqueous extracts were acidified, extracted with benzene, washed with water and evaporated in vacuo. The oily residue of 2-(γ-carbomethoxypropyl)-3-keto-4-cyanothiophane weighed 3.2 g.

*Example 3*

To the dry sodium ethylate from 2.3 g. of sodium obtained by evaporating the ethanolic solution to dryness in vacuo was added 12 g. of ethyl thioglycolate and 10.5 g. of β-propyl acrylonitrile in 35 cc. benzene. After being refluxed for three hours, during which time the insoluble sodium enolate separated, the mixture was acidified with acetic acid, washed with water and fractionally distilled. The main fraction boiling point 125°–135° C. (1 mm.) was redistilled, boiling point 128°–130° C. (1 mm.). Analysis showed the product to be 2-propyl-3-cyano-4-ketothiophane.

I claim:

1. A compound of the formula

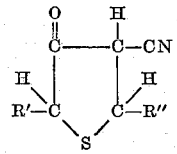

in which R' and R'' stand for a member of the group consisting of hydrogen, alkyl, carbalkoxy and carbalkoxyalkyl radicals, one of which is hydrogen.

2. A compound of the formula

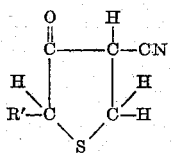

in which R' is a carbalkoxyalkyl radical.

3. 2-propyl-3-cyano-4-ketothiophane.
4. 2-(gamma-carbomethoxypropyl)-3-keto-4-cyanothiophane.
5. 2-(delta-carbomethoxybutyl)-3-keto-4-cyanothiophane.

6. A method of preparing compounds corresponding to the general formula

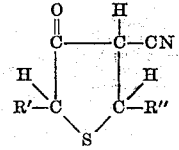

in which R' and R'' are members of a group consisting of hydrogen, alkyl, carbalkoxy and carbalkoxyalkyl radicals, one of which is hydrogen which comprises heating a compound having the formula

in which R' is as above and R is alkyl, with a compound having the formula

in which R'' is as above, in the presence of a compound selected from the group consisting of alkali metals, alkali metal alcoholates and alkali metal amides and an inert solvent.

7. A method of preparing 2-propyl-3-cyano-4-ketothiophane which comprises heating ethyl thioglycolate with beta-propyl acrylonitrile in the presence of sodium ethylate and an inert solvent.

8. A method of preparing 2(gamma-carbomethoxypropyl)-3-keto-4-cyanothiophane which comprises heating methyl alpha-mercaptoadipate with acrylonitrile in the presence of sodium methylate and an inert solvent.

9. A method of preparing 2-(delta-carbomethoxybutyl)-3-keto-4-cyanothiophane which comprises heating methyl alpha-mercaptopimelate with acrylonitrile in the presence of sodium methylate and an inert solvent.

BERNARD R. BAKER.